United States Patent
Rasmussen et al.

(10) Patent No.: US 8,619,348 B2
(45) Date of Patent: Dec. 31, 2013

(54) METHOD AND SYSTEM FOR IMPROVED SENSING WITH ROBUSTNESS TO BANDING FOR RENDERING DEVICES

(75) Inventors: Dan René Rasmussen, Pittsford, NY (US); R. Victor Klassen, Webster, NY (US); Wencheng Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1030 days.

(21) Appl. No.: 11/928,309

(22) Filed: Oct. 30, 2007

(65) Prior Publication Data

US 2009/0109505 A1 Apr. 30, 2009

(51) Int. Cl.
*H04N 1/46* (2006.01)
*G06F 15/00* (2006.01)
*G06K 1/00* (2006.01)
*H04N 1/60* (2006.01)
*G03F 3/08* (2006.01)

(52) U.S. Cl.
USPC ............... 358/504; 358/1.9; 358/518

(58) Field of Classification Search
None
See application file for complete search history.

(56) References Cited

U.S. PATENT DOCUMENTS

| 2006/0001911 A1* | 1/2006 | Viassolo et al. | 358/3.26 |
| 2008/0019611 A1* | 1/2008 | Larkin et al. | 382/287 |
| 2008/0043273 A1* | 2/2008 | Simske et al. | 358/1.14 |

* cited by examiner

*Primary Examiner* — Fan Zhang
(74) *Attorney, Agent, or Firm* — Fay Sharpe LLP

(57) ABSTRACT

For a selected class of functions, which describe most typical banding variations, the average response can be found by sampling at only $2^N$th locations, where N is the number of different frequencies of significant banding. This approach makes use of the fact that in most applications the banding frequencies of a given printer system, are known in advance, even if the amplitudes of the banding are not known. Each sample point requires a very small test area or pattern, significantly reducing the overall size of the required test areas.

16 Claims, 3 Drawing Sheets

METHOD AND SYSTEM FOR IMPROVED SENSING WITH ROBUSTNESS TO BANDING FOR RENDERING DEVICES

BACKGROUND

An imaging or rendering device, such as a printer or copier, typically creates images using combinations of four colors of marking agents or colorants, such as cyan, magenta, yellow and black (CMYK). The images are created based on image data which assigns at least one of the four colors and a numerical color intensity or input color value to each picture element or pixel in the image.

A variety of factors contribute to unintentional color variations. One problem is that, due to manufacturing variations, different imaging devices can output different intensities of color based on identical image data. For example, the density of the toner laid down on the print medium determines the color intensity. The denser or thicker the toner is laid down on a white print medium such as paper, the less white is visible through the toner on the paper. Consequently, the denser the toner, the less the lightness of the toner color, and the greater the intensity of the toner color.

Because there is such variation in color laid down by different imaging devices based on identical image data, color intensities that are output by some imaging devices can be outside of an acceptable range. Thus, in order to ensure that each imaging device outputs color intensities that closely correspond to the color intensities specified by the image data, each imaging device is typically calibrated to output appropriate color intensities.

For purposes such as printer color calibration, it is typically necessary to estimate the average response of the printer to different input colors. Such measurements are complicated by the fact that the response is typically confounded with spatial non-uniformity, such as banding. In order to assess the average response, measurements are taken over large segments in the process direction, with the hope of "averaging out" most of the variation caused by banding. This is very costly, especially for on-line color calibration systems, which need to operate with a minimum number of test patterns. Alternatively, patches of a given color have been replicated at random locations throughout the page. This simultaneously reduces the effects of streaks and bands, but is sub-optimal for bands.

FIG. 1 illustrates what a typical profile might look like in the presence of banding. The profile shows a response R measured as a function of the position, x, in the process direction. The measured response R could take a variety of forms including, for example, L* measured on paper. However, this discussion also applies in general, for example, to any applications where the appropriate measurements are performed, such as within the marking engine before transfer to paper, e.g. measurements on a photoreceptor belt.

In practice, each data point R(x) would be obtained by sensing R over a finite distance DX in the process direction and a finite distance DY in the cross-process direction. The size of the sample area given by DX and DY would be required to exceed a certain minimum, in order to address noise in both the printing process and sensing.

As seen from the illustration, any measurement where DX is small compared to the spatial scale of the variation will likely lead to erroneous estimates of the average response <R>. To minimize the error, the standard approach is to increase DX to the point where it is large enough that the variation is "averaged out." In practice, significant variations might be caused by problems such as once-around signatures, which can have a very long period, requiring DX, in some cases, to be in excess of 10 inches. In comparison, the mentioned minimum size of DX due to noise might be significantly less than one inch.

Alternatively, a statistical average can be calculated by replicating patches of a given color at pseudo-random locations throughout a larger region. This approach simultaneously reduces the effects of both banding and other non-uniformities, but is sub-optimal for banding. The situation is further complicated when multiple incommensurable banding frequencies are involved, in which case very large DX would be required to estimate the average <R>.

BRIEF DESCRIPTION

In one aspect of the presently described embodiments, the method comprises calculating a number of sampling sites based on at least one banding frequency of the image rendering device, determining locations of the sampling sites based on at least one banding period, printing test patterns at the sampling sites, analyzing the test patterns, determining an average response based on the analyzing, and, providing information to the image rendering device based on the average response.

In another aspect of the presently described embodiments, the number of sampling sites corresponds to a number of banding frequencies.

In another aspect of the presently described embodiments, determining the locations is further based on offsetting the locations in a direction perpendicular to the image bands.

In another aspect of the presently described embodiments, the analyzing is accomplished using a scanner.

In another aspect of the presently described embodiments, the analyzing is accomplished using a spectrophotometer.

In another aspect of the presently described embodiments, the average response corresponds to at least one printing parameter.

In another aspect of the presently described embodiments, the printing parameter is lightness.

In another aspect of the presently described embodiments, the printing parameter is color.

In another aspect of the presently described embodiments, the method further comprises calibrating the image rendering device based on the information.

In another aspect of the presently described embodiments, the system comprises a printing device operative to print test patterns, a measuring device for analyzing the test patterns and a processor operative to calculate a number of sampling sites for the test patterns based on the at least one banding frequency, determine locations of the sampling sites based on at least one banding period, determine an average response based on the analyzed test patterns and provide information based on the average response.

In another aspect of the presently described embodiments, the number of sampling sites corresponds to a number of banding frequencies.

In another aspect of the presently described embodiments, the processor determines the locations based on offsetting the locations in a direction perpendicular to the image bands.

In another aspect of the presently described embodiments, the measuring device is a scanner.

In another aspect of the presently described embodiments, the measuring device is a spectrophotometer.

In another aspect of the presently described embodiments, the average response corresponds to at least one printing parameter.

In another aspect of the presently described embodiments, the printing parameter is lightness.

In another aspect of the presently described embodiments, the printing parameter is color.

In another aspect of the presently described embodiments, the processor provides feedback to calibrate the image rendering device.

In another aspect of the presently described embodiments, the system comprises means for calculating a number of sampling sites based on the at least one banding frequency of the image rendering device, means for determining locations of the sampling sites based on at least one banding period, means for printing test patterns at the sampling sites, means for analyzing the test patterns, means for determining an average response based on the analyzing, and, means for providing information to the image rendering device based on the average response.

In another aspect of the presently described embodiments, the means for determining the locations further determines the locations based on offsetting the locations in a direction perpendicular to the image bands.

DETAILED DESCRIPTION

According to the presently described embodiments, for a selected class of functions, which describe most typical banding variations, the average response can be found by sampling at only $2^N$ locations, where N is a number of different frequencies of significant banding. This approach makes use of the fact that, in most applications, the banding frequencies of a given printer system, are known in advance—even if the amplitudes of the banding are not known. Each sampling point uses, in one form, a very small test area, significantly reducing the overall size of the test areas or patterns.

Figure 1:
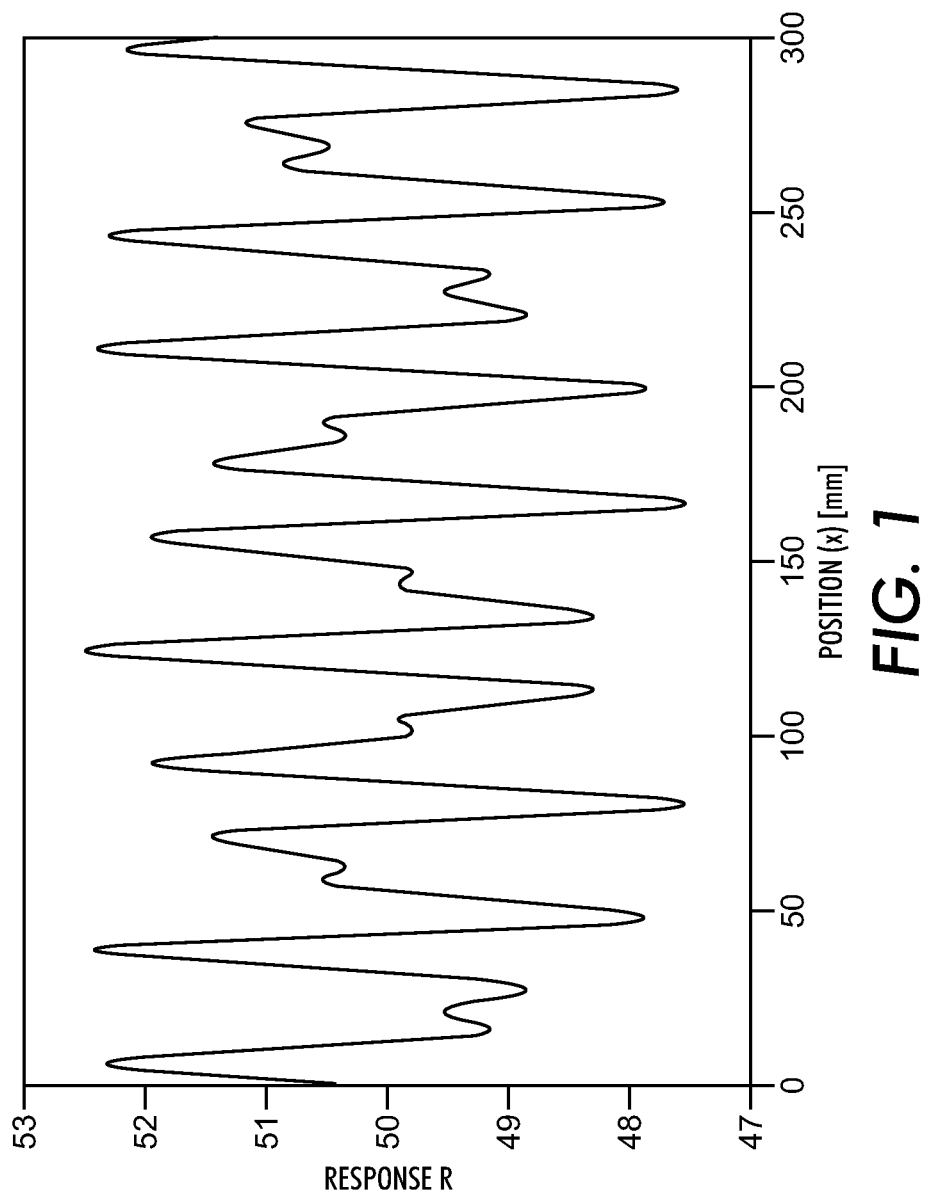
FIG. 1 is a graph of a typical response for an image rendering device producing image bands.
Figure 2:
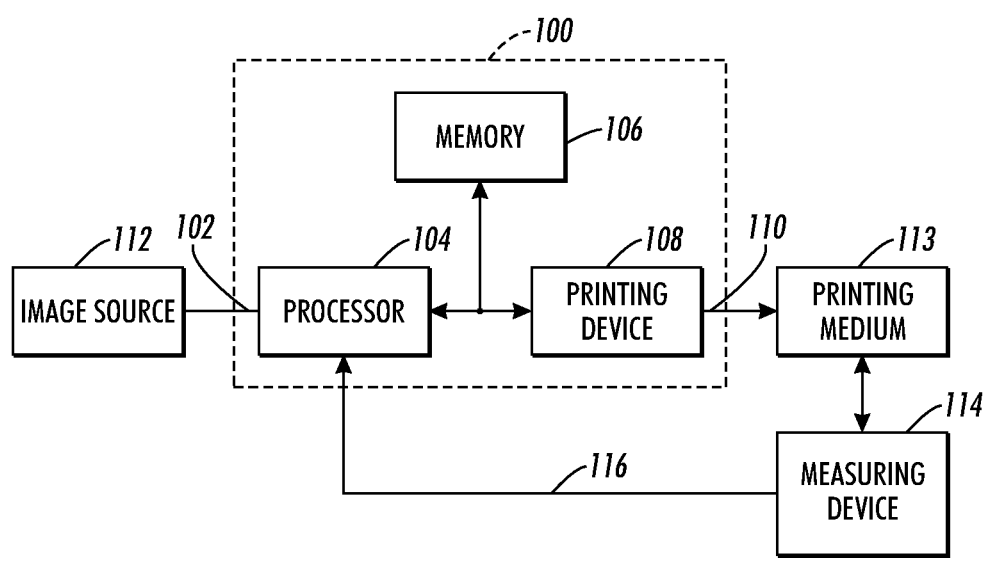
FIG. 2 is a system into which the presently described embodiments may be incorporated.

Along these lines, FIG. 2 shows, among other functions, a system that prints test patches, measures color output values of the test patches, and calibrates the color output characteristics of the system based upon the measured color output values. The system includes an arrangement 100, an image source 112, a print medium 113, and a measuring device such as a color-measuring device 114.

The arrangement 100 includes an input 102, a processor 104, a memory 106, a printing device 108, and an output 110. In general, the arrangement receives at the input 102 an image and generates at the output 110 printed pages of recording media from which the image may be physically reconstructed.

The image source 112 can be any suitable device that generates image data corresponding to a two-dimensional image. The image source 112 is further configured, in one form, to provide image data corresponding to a configuration of test patches that are used to calibrate the arrangement 100, as will be discussed in more detail below. To this end, the image source 112 can be a general purpose computer that generates printable output data, such as that generated using charting software, presentation software, computer-aided design software, and the like. In other words, the data can be generated as a software output file. Alternatively, the image source 112 can be in the form of a processor that can be found, for example, in a color copier. Such a processor can be either separate from or integral with the processor 104. It will be appreciated that the image source 112 can, in some cases, be a software routine that is performed by the processor 104. For example, the software routine can output a sequence of colors and input color values with which test patches are to be produced by the printing device 108. However, typically, the image source 112 will be a separate device that may or may not include other processors. The image source can possibly provide the image data in any color space, including CMYK, RGB, CIELAB, etc.

Still referring to the arrangement 100, the processor 104 is a controller, microprocessor, microcontroller, programmable digital logic circuit, or other processing device, that is operable to, among other things, generate color input values in CMYK color space that correspond to the image data received from the image source 112. In most cases, the CMYK color input values will be generated by the processor 104 with the intent of causing the printing device 108 to produce an output 110 that is an accurate visual manifestation of the image data that is contained in the input 102.

The printing device 108 is a device that is operable to print the image information from the processor 104 and/or the memory 106 onto a recording medium or print medium. To this end, the printing device 108 may be an ink jet printer, a laser printer, a xerographic printing device, or other printing device that is operable to print to a recording medium based on pixel data in scan line or raster format. The printing device 108 typically uses marking agents, such as ink or toner, which can be available in four colors, such as cyan, magenta, yellow and black.

In order that the printing device 108 can achieve the many shades of color in the input color values with only the four colors of marking agents at its disposal, the processor 104 may, for example, transform the input color values into halftoned pixel data, as is well known in the art. Accordingly, the processor 104 in this embodiment is operable to translate the CMYK input color values calculated by the processor into halftone pixel data that can be stored in the memory 106. The processor 104 is also operable to coordinate the transfer of the halftone pixel data from the memory 106 to the printing device 108. To this end, it will be appreciated that the processor 104 as depicted herein can include one device or several devices that perform the various processing steps described above.

The measuring device 114 may take a variety of forms and receives the output of the printing device 108 that is printed on a print medium 113, such as paper. In accordance with at least one of the presently described embodiments, the device is a color-measuring device 114 in the form of a spectrophotometer or light sensor that measures the color output values of an array of rows and columns of test patches that are printed on one or more sheets of paper by the printing device 108. The color-measuring device 114 generally emits light onto each of the test patches and measures an amount of light that is reflected by the patch and back to the color-measuring device. The darker the test patch, the less light that is reflected back to the color-measuring device 114. The color-measuring device 114 transmits a signal 116 to the processor 104. The signal 116 indicates the output color values measured for each of the test patches. The color-measuring device 114 can include a light-emitting diode (LED) to emit light onto the patches, and a photosensitive diode to sense the amount of light being reflected by the patches. If in the form of a scanner, the color-measuring device 114 can contain document illumination lamps, optics, a mechanical scanning drive, and a charge coupled device (CCD array) or full width color scanning array.

Although the color-measuring device can be attached to the arrangement 100, it is more typical for the color-measuring device 114 to be separate from the arrangement 100. More particularly, the color-measuring device 114 can be provided in the factory where the imaging device 100 is manufactured. In this case, the color-measuring device 114 can be used to calibrate the output of the imaging device 100 before the imaging device 100 leaves the factory. Alternatively, or additionally, the color-measuring device 114 can be provided at the facility where the imaging device 100 operates in order to occasionally calibrate the output of the imaging device 100 over the course of its useful life.

Figure 3:
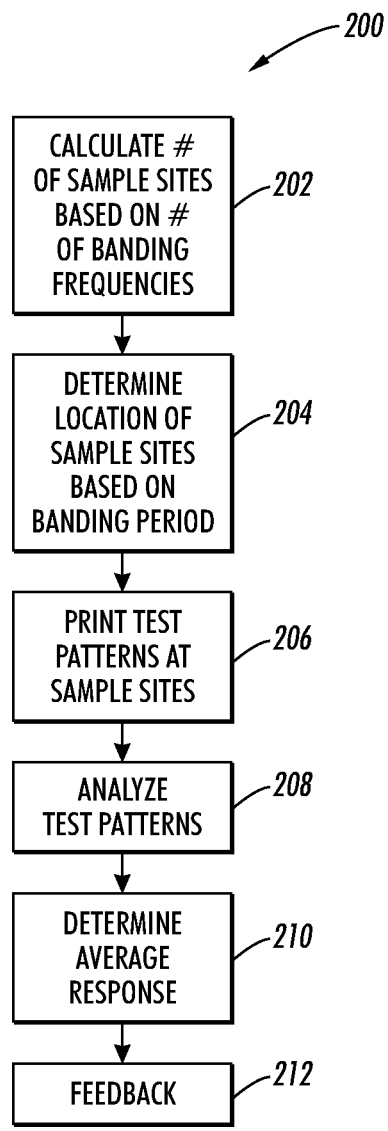
FIG. 3 is a flow chart illustrating a method according to the presently described embodiments.

With reference now to FIG. 3, a method according to the presently described embodiments is described. It should be appreciated this method may be implemented using a variety of hardware configurations and/or software techniques. For example, software routines may be run by the processor 104 which accesses memory 106 and sends data to and receives data from the printing device 108 and measuring device 114. A variety of configurations are contemplated.

Referring now back to FIG. 3, a method 200 is initiated by calculating a number of sample sites based on the number of banding frequencies of particular image rendering device (at 202). As alluded to above, the number of banding frequencies is typically a piece of information that is known or can be readily determined. So, in one form, $2^N$ sample sites is selected as the number of sites upon which test patterns will be printed, where N is the number of banding frequencies.

The locations of the sample sites are then determined based on the banding (at 204). For example, if two sites are being utilized for a single banding frequency, a first location x will be a first site and a second location x+banding period/2 will be a second site. The banding signatures for a single banding frequency and multiple banding frequencies are discussed in more detail below.

Next, the test patterns are printed at the sample sites (at 206). The selection of test patterns and the manner of printing can be accomplished in a variety of suitable manners. In one form, the user selects the patterns through the processor and memory, and the printing device prints the patterns. These test patterns are then analyzed using, for example, the measuring device (at 208). The average response is determined (at 210) in any suitable manner by, for example, the processor 104. It should be appreciated that the data on the average response may be used in a variety of manners; however, in one form, the information is provided to the processor to further control the printing process as a form of feedback (at 212).

As noted above, the locations for the test pattern sampling sites can be determined mathematically in a number of ways. One manner of so determining the locations is described below.

Banding signatures, for a single banding frequency, are by definition periodic in the x (process) direction. They are often well described by sinusoidal-like signatures. More generally, they can typically be described by a function, f(x), which is periodic and symmetric:

$$f(x+p)=f(x) \qquad \text{Eq. (1)}$$

$$f(x+p/2)=-f(x) \qquad \text{Eq. (2)}$$

The response can be written:

$$R(x)=<R>+Af(x-\phi) \qquad \text{Eq. (3)}$$

where $\phi$ is an offset (phase) in the x-direction, A is an amplitude, and where f satisfies Eq. (2) (and therefore also Eq. (1)).

In this case it can be shown, that the average response is given by:

$$<R>=[R(x_1)+R(x_1+p/2)]/2 \qquad \text{Eq. (4)}$$

regardless of the value of $x_1$ and the phase $\phi$.

Assuming that the banding period, p, is known, this shows that the average response <R> can be calculated exactly based on the average of only two spot measurements, at $x_1$ (arbitrarily chosen) and at $x_1+p/2$.

For the more general case, if the response is a linear combination of multiple banding signatures—which is often a good approximation—then it can be shown, that the average response can be found exactly, by sampling at only $2^N$ locations, where N is the number of different frequencies of banding.

In this regard, assume that the overall variation caused by banding is a linear superposition of a finite number, N, of banding signals, described by functions $$f_k: \Re \to \Re, \, k=1, \ldots, N$$

with each function satisfying:

$$\forall x \in \Re : f_k(x)+f_k(x+h_k)=0 \qquad (A1)$$

corresponding to Eq. (2), where $h_k$ is half of the banding period. The overall variation is then given by $$F_N(x) = \sum_{k=1}^{N} f_k(x) \qquad (A2)$$

It is possible to find $2^N$ constants $s_i$ such that when $F_N$ is sampled at positions offset by those amounts, the sum is zero, and thus the effect of banding on the measured average signal is eliminated. That is:

$$\exists s_i \in \Re : \forall x \in \Re : \sum_{i=1}^{2^N} F_N(x+s_i) = 0 \qquad (A3)$$

The proof is by induction, and since the case for N=1 was already proven above, it is only necessary to prove that if proposition (A3) holds for N−1, then it must also hold for N. We therefore assume that (A3) holds for N−1, and select $2^{(N-1)}$ constants $u_i$ such that we have:

$$\forall x \in \Re : \sum_{i=1}^{2^{N-1}} F_{N-1}(x+u_i) = 0 \qquad (A4)$$

Now, select $2^N$ constants as follows:

$$s_i=u_i \qquad (A5)$$

$$s_{2^{N-1}+i}=+u_i+h_N \qquad (A6)$$

for i=1 ... $2^{(N-1)}$. We then have:

$$\sum_{i=1}^{2^N} F_N(x+s_i) = \sum_{i=1}^{2^{N-1}} [F_N(x+u_i) + F_N(x+u_i+h_N)] \qquad (A7)$$

-continued $$= \sum_{i=1}^{2^{N-1}} [F_{N-1}(x+u_i) + f_N(x+u_i) +$$

$$F_{N-1}(x+h_N+u_i) + f_N(x+u_i+h_N)]$$

$$= \sum_{i=1}^{2^{N-1}} [f_N(x+u_i) + f_N(x+u_i+h_N)]$$

$$= 0$$

where the first equality follows from (A5) and (A6), and the second equality follows from $F_N = F_{N-1} + f_N$. The third equality follows because (A4) implies that the first and third terms within the square brackets sum to zero. The final equality follows because (A1) implies that each term in the sum is zero. QED.

Given this method of sampling, test patterns can be designed accordingly, providing the increased efficiency. As an example of how a test pattern that is robust against the presence of banding signatures can be designed, only one significant banding signature need be considered.

To provide side-to-side robustness, and for other reasons, it is effective to print several patches of a given color in different columns on the page.

Along these lines, to distribute patches, the procedure is as follows:

1. Initialize a boolean array O of occupied patch locations to all false.
2. for a patch color with M required locations
3. if M<2,
   a. set M=2
4. select the first available location for the first location for this patch color; set the corresponding entry in the occupied patch locations array to true.
5. for each of the remaining M−1 locations for this patch color (locations with i=0. M−2)
   a. determine a row of patches that is the distance away from the first one that comes closest to kp+p/M, and has not already been used for this color, and where k is allowed to take any integer value.
   b. If there remain any unoccupied columns in that row, different from columns already used for this color, randomly select one of them, set its location to true in O, and assign the current color to that location. Otherwise find the next row as in step 5a, beyond the one found the last time, and continue until either there are no more rows on the page, or a location has been found.
   c. If no location is found, randomly select an unoccupied location. If all patch locations in O are true, begin laying out patches on a new page.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for determining an average response of an image rendering device, the device producing bands in images with at least one banding frequency, the method comprising:
   calculating a number of sampling sites as a function of a number of the at least one banding frequency of the image rendering device, wherein the number of sampling sites is $2^N$ where N is the number of the at least one banding frequency of the image rendering device;
   determining locations of the sampling sites based on at least one banding period of the bands;
   printing test patterns at the sampling sites;
   analyzing the test patterns;
   determining the average response of the image rendering device based on the analyzing; and,
   providing information to the image rendering device based on the average response.

2. The method as set forth in claim 1 wherein the determining the locations is further based on offsetting the locations in a direction perpendicular to the image bands.

3. The method as set forth in claim 1 wherein the analyzing is accomplished using a scanner.

4. The method as set forth in claim 1 wherein the analyzing is accomplished using a spectrophotometer.

5. The method as set forth in claim 1 wherein the average response corresponds to at least one printing parameter.

6. The method as set forth in claim 5 wherein the printing parameter is lightness.

7. The method as set forth in claim 5 wherein the printing parameter is color.

8. The method as set forth in claim 1 further comprising calibrating the image rendering device based on the information.

9. A system where determining an average response of an image rendering device producing bands in images with at least one banding frequency, the system comprising:
   a printing device operative to print test patterns;
   a measuring device operative to analyze the test patterns; and,
   a processor operative to calculate a number of sampling sites for the test patterns wherein the number of sampling sites is $2^N$ where N is the number of the at least one banding frequency of the image rendering device, determine locations of the sampling sites based on at least one banding period, determine an average response of the image rendering device based on the analyzed test patterns and provide information based on the average response.

10. The system as set forth in claim 9 wherein the processor determines the locations based on offsetting the locations in a direction perpendicular to the image bands.

11. The system as set forth in claim 9 wherein the measuring device is a scanner.

12. The system as set forth in claim 9 wherein the measuring device is a spectrophotometer.

13. The system as set forth in claim 9 wherein the average response corresponds to at least one printing parameter.

14. The system as set forth in claim 13 wherein the printing parameter is lightness.

15. The system as set forth in claim 14 wherein the printing parameter is color.

16. The system as set forth in claim 9 wherein the processor provides feedback to calibrate the image rendering device.

* * * * *